United States Patent [19]

Goodwin

[11] 3,853,069

[45] Dec. 10, 1974

[54] VEHICLE STEERING MEANS

[75] Inventor: Laurence Goodwin, Harpenden, England

[73] Assignee: Hawker Siddeley Dynamics Limited, Hatfield, Hertfordshire, England

[22] Filed: Aug. 18, 1972

[21] Appl. No.: 281,857

[30] Foreign Application Priority Data
Aug. 19, 1971   Great Britain.................... 38880/71

[52] U.S. Cl................................. 180/79, 104/245
[51] Int. Cl............................................... B62d 3/00
[58] Field of Search ........... 180/79; 104/244.1, 242, 104/245, 247, 60; 280/90

[56] References Cited
UNITED STATES PATENTS

| 725,456 | 4/1903 | Lemp..................................... 280/90 |
| 751,575 | 2/1904 | Veeder .................................. 280/90 |
| 2,277,197 | 3/1942 | Ash........................................ 280/90 |
| 3,635,304 | 1/1972 | Hills....................................... 180/79 |
| 3,724,584 | 4/1973 | Varichon ......................... 104/244.1 |

FOREIGN PATENTS OR APPLICATIONS

| 309,612 | 7/1933 | Italy....................................... 180/79 |
| 736,602 | 5/1932 | France................................... 180/79 |

Primary Examiner—Trygve M. Blix
Assistant Examiner—Sherman D. Basinger
Attorney, Agent, or Firm—Rose & Edell

[57] ABSTRACT

Steering apparatus for causing a wheeled vehicle automatically to follow a roadway or prepared track comprises a follower on the vehicle mounted on the forward end of a pivoted lever so as to be movable laterally to and fro to trace the line of a stationary longitudinal guidance element lying along the length of the track. The lever carrying the follower, which lever projects forwardly of the axle of the steerable wheels, has its rear part resiliently coupled to the track rod of a self-centering steering mechanism for the wheels.

10 Claims, 4 Drawing Figures

VEHICLE STEERING MEANS

This invention relates to the steering or guidance of wheeled vehicles. More particularly, it is concerned with means for steering the front or rear wheels of a vehicle when it is required that the vehicle shall automatically follow, in a stable manner, a defined course along a rod or other track-way having a prepared surface.

According to the present invention, there is provided apparatus for steering a wheeled vehicle comprising follower means mounted on the vehicle and arranged for shifting laterally to and fro relatively to the vehicle while following the line of a longitudinally extending stationary guidance element lying substantially continuously along the length of the track, a self-centering steering mechanism whereby steerable wheels of the vehicle are steered, and operative connections, that include resilient coupling and damping means, between the follower means and the steering mechanism such that the lateral movements of the follower means are translated into steering movements of the steering mechanism.

In the preferred form, the follower, which is constrained to follow a longitudinal feature built into the track, is carried on one end of a lever which is pivotally mounted on the vehicle to enable the end carrying the follower to swing laterally to and fro. The lever may be connected to the wheel-steering mechanism by a set of springs, and also a damper or dampers, in such a manner as to ensure that when lateral follower movement occurs the wheels will be steered in a direction that will guide the vehicle to follow the longitudinal feature of the track engaged by the follower. The wheel-steering mechanism is itself provided with a further set of springs and a damper or dampers for self-centering purposes.

The importance of the resilient coupling and damping means between the follower and the steering mechanism is that it enables the vehicle to be steered in a stable fashion with a significantly shorter follower lever than would otherwise to possible. Indeed, although the follower lever will normally extend horizontally forward from the axle of the steered wheels the shortening of this lever now made possible enables it to be disposed vertically in some cases, if desired.

Various configurations of steering assembly according to the invention will now be described by way of example, with reference to the accompanying drawings, in which.

Figure 1:
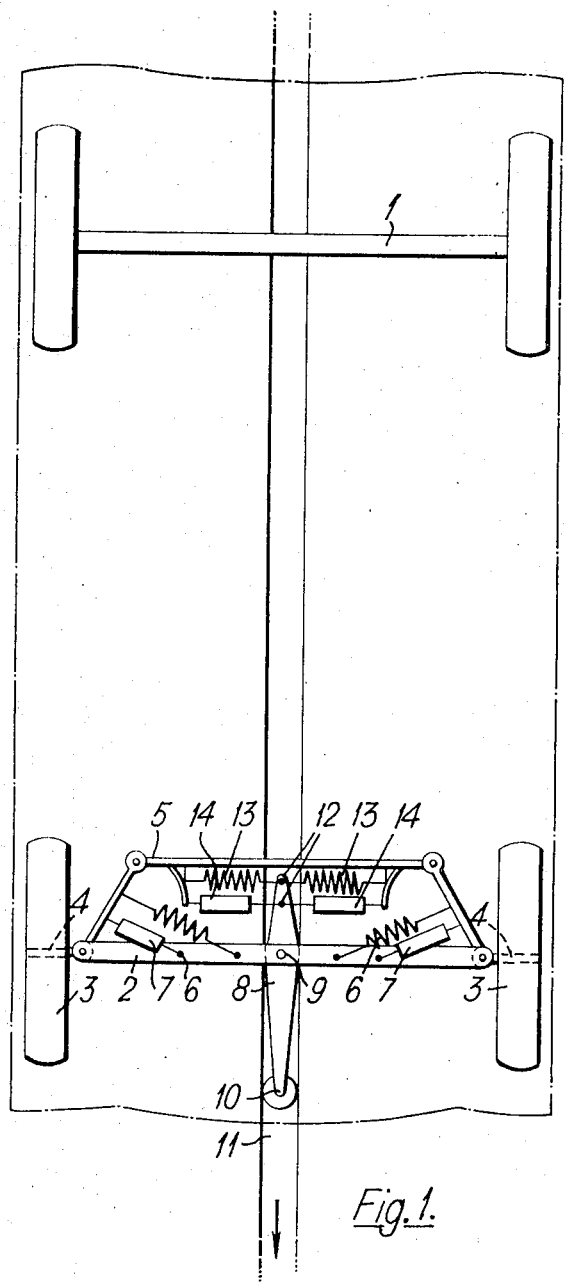
FIG. 1 is a diagrammatic plan of one arrangement according to the invention.

Referring firstly to FIG. 1, a four-wheeled vehicle is equipped with a fixed rear axle 1 and a front axle beam 2 with two wheels per axle. The front wheels 3 are steerably mounted on stub axles 4 carried by king pins at the ends of the axle beam 2 and are connected for steering purposes by an Ackerman linkage which includes a track rod 5. The steering mechanism so formed is fitted with self-centering springs 6 and a damper or dampers 7.

A lever or actuating bar 8 lying generally in a fore and aft direction is mounted on the middle of the front axle beam 2 by means of a swivel bearing 9 and is equipped with a follower 10 at its front end. When the vehicle is travelling forward, the follower 10 proceeds in advance of the front axle 2, while maintaining engagement in a slot 11 formed along the centre of a track which the vehicle is to follow. At the rear end of the follower lever 8, behind the bearing 9, there are connection points 12 resiliently coupled to the Ackerman track rod 5 by means of springs 13 and a damper or dampers 14. Thus, asa the follower 10 on the lever 8 shifts as in either direction, when following a change in direction of the slot 11, a steering movement in the appropriate direction is imparted to the front wheels 3 through the resilient connection between the rear end of the lever 8 and the track rod 5. The longitudinal slot 11 along the track to be followed by the vehicle may, of course, be replaced by a centre rail.

A further variant involves equipping the forward end of the follower with lateral projections to be constrained by side walls along the track. The lateral projections may be articulated in any suitable manner. In another form, there may be a single central upstanding web along the track upon which the follower is guided by means of co-acting rollers on the follower engaging opposite sides of the web.

The follower may also be constrained to follow a single vertical longitudinal surface by means of a lateral biasing force applied to the follower lever from the axle or chassis of the vehicle. Such biasing force may be generated by a spring or by an actuator under selective control.

Figure 2:
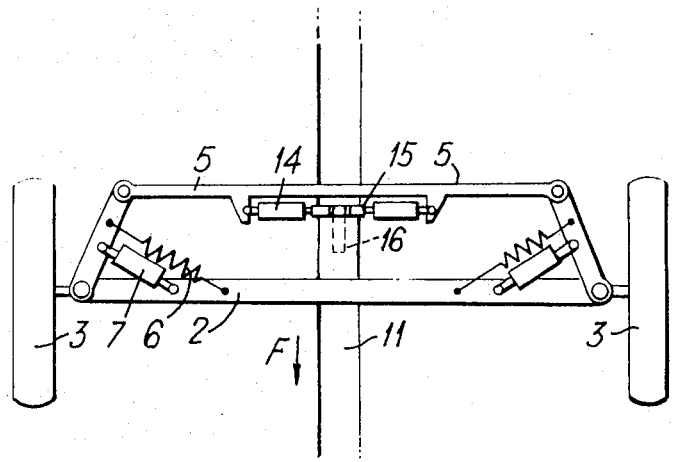
FIG. 2 is a similar plan of a second arrangement.
Figure 3:
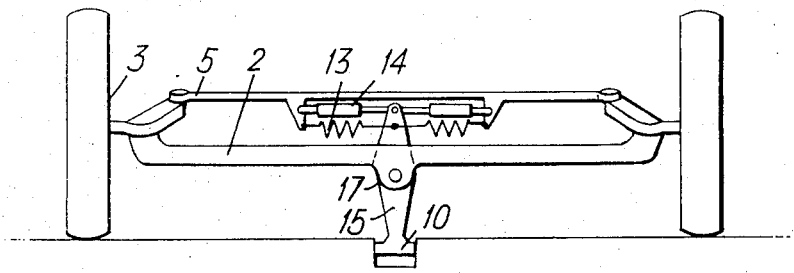
FIG. 3 is a view in elevation of the arrangement of FIG. 2.

In FIGS. 2 and 3 of the drawings, an arrangement is shown in which, instead of extending horizontally, the follower lever 15 lies in the vertical plane. The follower 10 is at the lower end of the lever 15, the upper end of the lever is coupled to the track rod 5 by means of the springs 13 and dampers 14, and at an intermediate point the lever is pivotally mounted to swing about a horizontal fore-and-aft axis by means of a pivot pin 16 received in a horizontal boss 17 on the axle 2.

The arrangement of FIGS. 2 and 3 is appropriate for steering a vehicle travelling in the direction of the arrow F in FIG. 2. For the reverse direction of travel, i.e., with the track rod 5 leading the axle 2 instead of trailing it, the vertical positions of the track rod and axle will need to be interchanged, so that the axle is above the track rod instead of below as in FIG. 3, in order that the pivotal mounting of the follower lever 15 on the axle can now be at the upper end of the lever while the resilient connection of the lever to the track rod is intermediate the lever ends.

Similarly, if in FIG. 1, the track rod 5 were to lead the axle 2 instead of trailing it, then the follower lever 8 would operate correctly if its rear end were pivotally mounted on the axle 2, with the resilient connection to the track rod located more forward at a position intermediate the lever ends.

Figure 4:
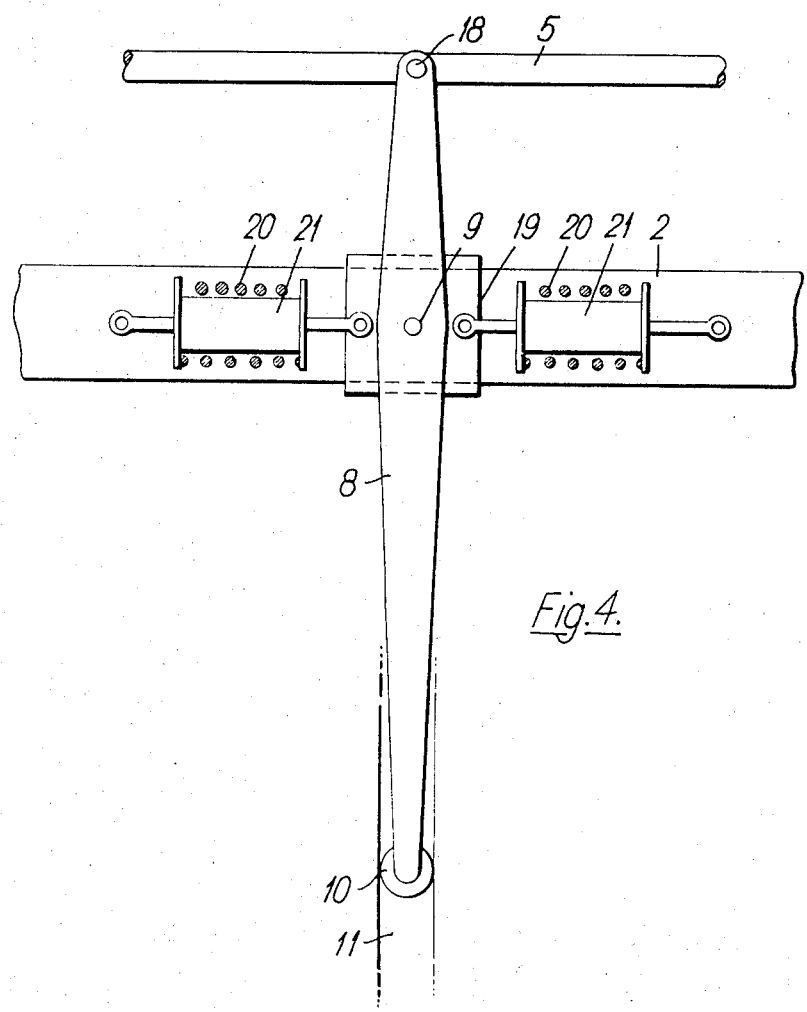
FIG. 4 shows in plan a modification of the arrangement of FIG. 1.

It is not essential that the springs and dampers in the coupling between the follower and the steering gear be actually connected between the follower lever and the track rod. They can instead be placed between the follower and the follower lever or associated with the pivotal mounting of the follower lever on the axle or other fixed part of the vehicle structure. This last possibility is shown in FIG. 4, in which the rear end of the follower lever 8 is connected to the track rod 5 by a simple non-resilient swivel pin or pivot 18, while at the intermediate mounting of the lever on the axle 2 the lever pivot 9 is carried by a slide 19 that is able to move within limits in both directions along the axle under the control of return springs 20 and dampers 21.

In a further development of the steering control, the longitudinal guiding feature of the track is in the form of a buried cable or wire carrying an alternating current. In this case the follower lever may be equipped with an actuator to move the follower end of the lever laterally, relatively to the vehicle, so that this end of the lever is controlled to remain over the wire in the track. The necessary signal data to control the position of the lever is obtained electro-magnetically by means of a pair of coils mounted on the follower end of the lever and capable of detecting changes in the inductive field of the A.C., current in the cable. The data from the coils is employed to position the follower via the actuator and so the steerable wheels of the vehicle are turned as before.

Although in the system described the front wheels of the vehicle are steerable, the invention may be employed similarly to steer the rear wheels. Thus, if both the front and the rear wheels have an Ackerman steering mechanism as described above and each wheel pair has a guided track follower or probe coupled to the respective steering mechanism, both pairs of wheels may be steered so that the vehicle follows the track with greater precision.

What is claim is:

1. Apparatus for steering a wheeled vehicle, comprising a longitudinally-extending stationary guidance element lying substantially continuously along the length of a track that the vehicle is to follow, follower means mounted on the vehicle and arranged for shifting laterally to and fro relatively to the vehicle while following the line of said guidance element, a steering mechanism whereby steerable wheels of the vehicle are steered, means for automatically centering said steering mechanism, and means operatively connecting the follower means to the steering mechanism such that the lateral movements of the follower means are translated into steering movements of the steering mechanism, said connecting means including both resilient-coupling means and damping means whereby said steering movements are both resiliently transmitted and damped.

2. Apparatus according to claim 1, wherein the follower means is carried on one end of a lever which lever is pivotally mounted on the vehicle to enable said lever end to swing laterally to and fro relatively to the vehicle as the follower follows the guidance element, and the resilient coupling and damping means is connected between the lever and the steering mechanism.

3. Apparatus according to claim 2, wherein the lever extends generally fore and aft and swings in a substantially horizontal plane, and the follower means is carried in advance of an axle of the steerable wheels at the forward end of the lever, the rear part of the lever being resiliently coupled to a steering track rod.

4. Apparatus according to claim 2, wherein the lever extends generally vertically and swings about a horizontal fore and aft pivot axis, and the follower means is carried below an axle of the steerable wheels at the lower end of the lever, the upper part of the lever being resiliently coupled to a steering track rod.

5. Apparatus according to claim 1, wherein the resilient coupling and damping means comprise a set of springs and a damper or dampers.

6. Apparatus according to claim 1, wherein the self-centering of the steering mechanism is effected by a set of springs and dampers.

7. Apparatus according to claim 1, wherein the follower means is mechanically constrained to follow the guidance element, the latter taking the form of a rail extending along the track.

8. Apparatus according to claim 7, wherein the follower means comprises a roller biased against a single longitudinal substantially vertical surface of the guidance element.

9. Apparatus according to claim 1 wherein the follower means comprises coil means electromagnetically tracing a guidance element in the form of a wire extending along the track and carrying an electric current.

10. Apparatus according to claim 1, applied to both front and rear steerable wheels of a vehicle.

* * * * *